United States Patent [19]

Michalke

[11] Patent Number: 4,641,390
[45] Date of Patent: Feb. 10, 1987

[54] WINDSHIELD WIPER EXTENSION MECHANISM

[75] Inventor: Klaus A. Michalke, Sterling Heights, Mich.

[73] Assignee: Chrysler Motors Corporation, Highland Park, Mich.

[21] Appl. No.: 779,349

[22] Filed: Sep. 23, 1985

[51] Int. Cl.[4] .............................. B60S 1/32; B60S 1/40
[52] U.S. Cl. ................................. 15/250.23; 15/250.32
[58] Field of Search ............ 15/250.23, 250.21, 250.32

[56] References Cited

U.S. PATENT DOCUMENTS

| | | | |
|---|---|---|---|
| 2,356,424 | 8/1944 | Paton | 15/250.23 |
| 2,550,094 | 4/1951 | Smulski | 15/250.23 |
| 2,811,736 | 11/1957 | Kurkechian | 15/250.23 |
| 2,821,735 | 2/1958 | Perkins et al. | 15/250.23 X |
| 3,143,754 | 8/1964 | Wolf | 15/250.23 |
| 3,378,874 | 4/1968 | Scinta | 15/250.32 |
| 3,793,670 | 2/1974 | Riester et al. | 15/250.04 |
| 4,512,056 | 4/1985 | Wattier | 15/250.23 |

FOREIGN PATENT DOCUMENTS 1138725  2/1957  France .............................. 15/250.23

Primary Examiner—James Kee Chi
Attorney, Agent, or Firm—Edward P. Barthel

[57] ABSTRACT

An improved windshield wiper system having an articulated wiper arm assembly, in the form of a wiper arm and a drag arm, which incorporates a three-link parallelogram arrangement wherein a greater blade wiping area is attained at selected portions of the windshield. A portion of the outer end of the wiper arm is pivotally connected to one end of each of a pair of parallel outer and inner links. The other ends of the pair of links are pivotally connected to a blade support link such that the blade is maintained parallel with the wiper arm. The free end of the drag arm is pivotally connected to an intermediate point on the inner link. Consequently, the blade is positioned at a radially minimum location when the blade is at its rest or park position and a radially maximum location upon the blade traversing a predetermined arc.

1 Claim, 2 Drawing Figures

WINDSHIELD WIPER EXTENSION MECHANISM

BACKGROUND OF THE INVENTION

This invention relates to a windshield wiper mechanism and particularly to an articulated wiper arm mechanism including a three-link parallelogram arrangement with said wiper arm for extending the wiper blade pattern.

It is known to provide an articulated wiper arm mechanism for vehicles to increase the windshield area traversed by the wiper blade. An example of such an articulated windshield wiper arm assembly is shown in U.S. Pat. No. 3,793,670 issued Feb. 26, 1974 to Riester et al. The Riester et al patent shows a wiper mechanism with a wiper arm having its fixed or inner end secured to a pivot shaft and a pivot block at its free or outer end. A control or drag arm is shown pivotally connected at its inner end to a pivot pin adjacent the pivot shaft. At its outer end the drag arm is pivotally connected on an axis parallel to but spaced from the axis of the wiper arm forming a parallelogram linkage for pivoting the blade with respect to the wiper arm as the assembly traverses its arcuate path.

The U.S. Pat. No. 2,811,736 issued Nov. 5, 1957 to E. M. Kurkechian discloses a windshield wiper having a driving arm and a secondary or control arm similar to the Riester et al articulated arm mechanism. The Kurkechian arrangement provides a greater wiping area for "wraparound" windows with more lateral travel in the latter portion of the wiping pattern.

The U.S. Pat. No. 2,821,735 issued Feb. 4, 1958 to W. E. Perkins et al discloses a single arm windshield wiper wherein a blade fitting is joined to the arm by a floating or toggle connection composed of parallel links providing an overlapping wiper blade pattern.

The U.S. Pat. No. 2,550,094 issued Apr. 24, 1951 to T. J. Smulski and the U.S. Pat. No. 4,512,056 issued Apr. 23, 1985 to M. F. Wattier discloses vehicle wiper blade control linkage arrangement forming parallelogram or articulated systems so as to modify the windshield surface wiped by the blade.

SUMMARY OF THE INVENTION

An articulated wiper arm assembly is provided which uniquely incorporates a three-link parallelogram arrangement to interconnect the wiper blade to both the wiper arm and the drag arm. A feature of the present invention is to provide an articulated wiper and drag arm assembly wherein a greater blade wiping area is attained at selected portions of the windshield. It is another feature of the invention to position the wipe blade at a radially minimum location when the blade is at its rest or park position adjacent the windshield lower edge and a radially maximum location when the blade has traversed a predetermined arc.

The three-link parallelogram articulated wiper arm assembly utilizes a distal portion of the wiper arm as a fourth link by pivotally connecting one end of an outer link to the free end of the wiper arm. An inner link is pivotally connected at one end to a point on the wiper arm spaced a predetermined distance from the wiper arm's free end. The other ends of the pair of links are connected to a blade supporting link at a predetermined spaced interval such that the inner and outer links are maintained parallel. The blade is secured to the blade link by pin means extending away from the wiper arm at right angles to the blade link. The free end of the drag arm is pivotally connected to an intermediate point on the inner link. The present invention may be used on either a coordinated double wiper blade apparatus or in a single wiper blade apparatus capable of cleaning substantially the entire viewing area such as, for example, the rear window of a vehicle.

BRIEF DESCRIPTION OF THE DRAWINGS

These and other objects and features of the invention will become apparent to those skilled in the windshield wiper art upon reading the following description with reference to the accompanying drawings in which.

DETAILED DESCRIPTION OF THE INVENTION

Figure 1:
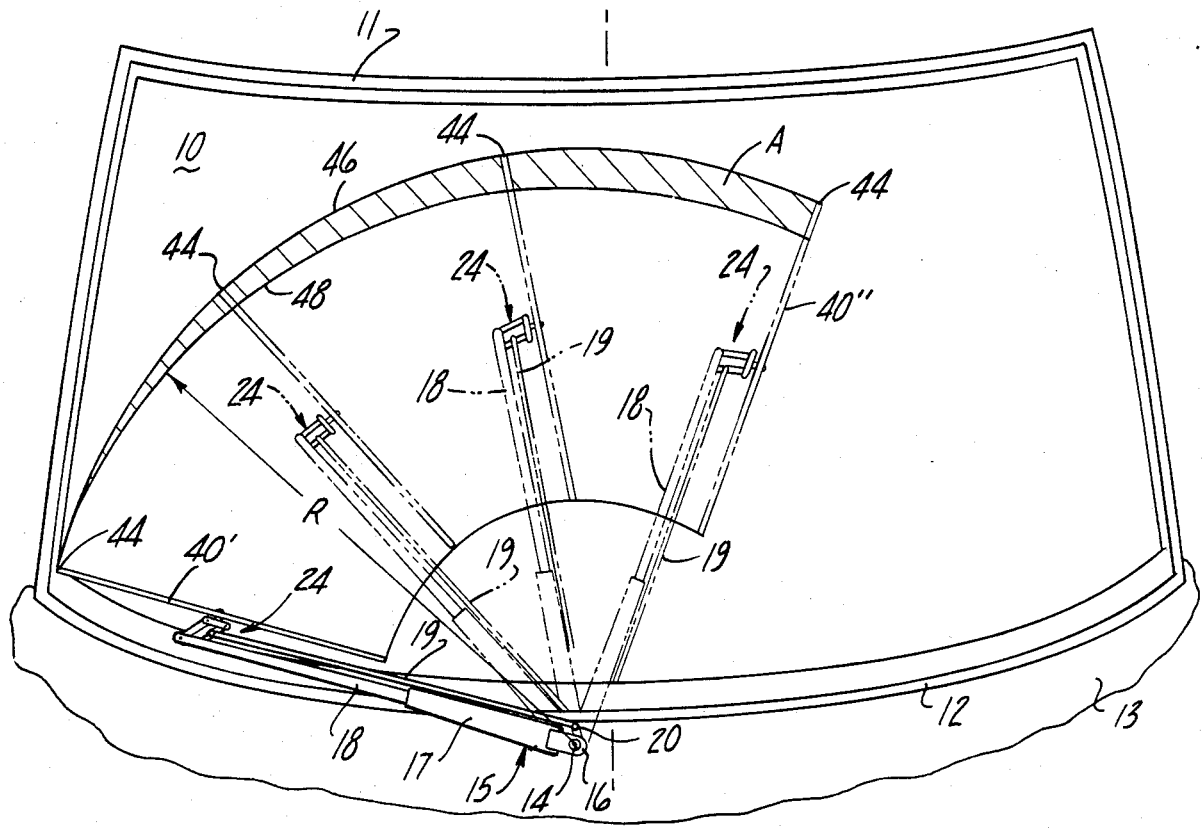
FIG. 1 is a fragmentary elevation view of a motor vehicle windshield embodying the invention.

In the drawings FIG. 1 shows a portion of a vehicle including a windshield 10 having a frontal portion of compound curvature that is considerably displaced from the vertical. The window 10 is fixed in a trim strip 11 having a lower reveal molding 12 which is attached to the vehicle cowl 13. A driving wiper shaft 14 is positioned in the vehicle cowl 13 and is adapted to be driven in an oscillatory manner by the usual windshield wiper motor as shown, for example, in the above mentioned U.S. Pat. No. 2,811,736.

A first or main wiper arm, generally indicated at 15, is drivingly connected to the shaft 14 at its inner mounting section 16. The wiper arm 15 also includes a channel shaped intermediate section 17 and an outer bar section 18. A second control or drag arm 19 is pivotally connected at one end to a pivot shaft 20 also positioned in the vehicle cowl 13 adjacent drive shaft 14. Suitable spring means biases the wiper arm 15 towards the window 10 as shown, for example, in U.S. Pat. No. 3,143,754 issued Aug. 11, 1964 to Wolf. In the disclosed embodiment the wiper arm 15 is shown in connection with a coordinated double blade system wherein the driver's side wiper arm has been omitted.

Figure 2:
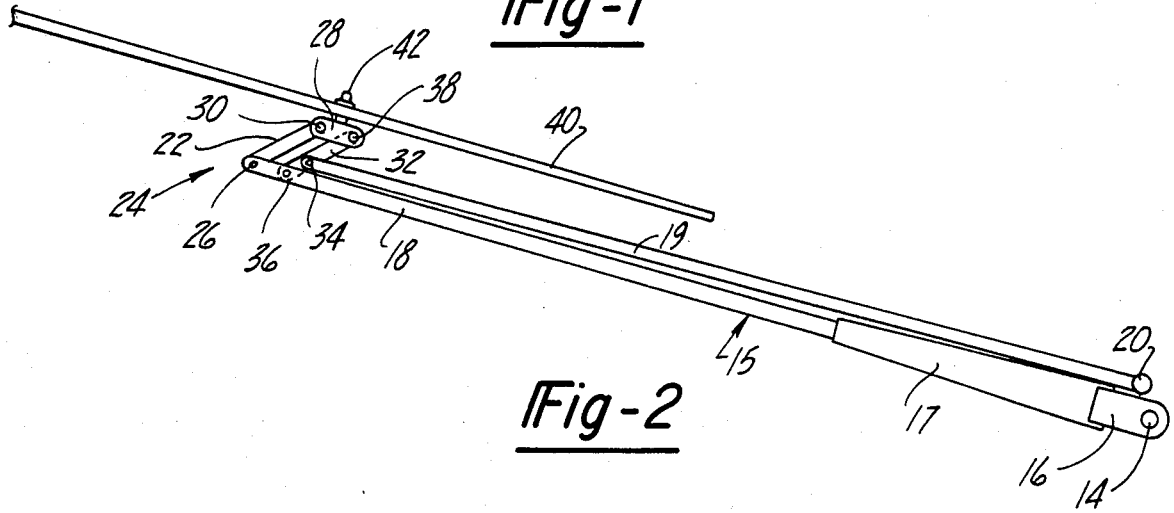
FIG. 2 is an enlarged plain view of the wiper assembly.

As best seen in FIG. 2 the outer end of the wiper arm bar section 18 is pivotally connected to one end of a first or outer link 22 of a three bar link parallelogram, generally indicated at 24, by a pivot pin 26. The other end of the outer link 22 is pivotally connected to one end of a second blade support link 28 by a pivot pin 30. The drag arm 19 has its outer free end pivotally connected to an intermediate portion of a third or inner link 32 by means of pivot pin 34. The inner link 32 has its one end pivotally connected to an intermediate portion of the wiper arm 15 by means of pivot pin 36. The other end of the inner link 32 is pivotally connected to the other end of the second blade support link 28 by means of pivot pin 38. It will be noted that the pivot pins 26 and 36 are spaced a distance equal to the space between the pivot pins 28 and 38 such that the outer 22 and inner 32 links are maintained parallel throughout the travel of the wiper arm.

A wiper blade 40 is connected to the second link 28 by connector means in the form of a conventional blade attaching pin 42. One example of such an attaching pin is shown in U.S. Pat. No. 3,378,874 issued Apr. 23, 1968 to A. C. Scinta the disclosure of which is incorporated by reference herein. The attaching pin 42 is shown extending at right angles from the second link 28 substantially in the plane of the links. The attaching pin 42 extends normally away from the wiper arm 15 such that the wiper blade 40 is maintained parallel to the wiper arm 15 throughout its travel.

As seen in FIG. 1 the wiper blade 40 is traversed throughout its wiping stroke from a first park or rest position 40' adjacent the lower left-hand blacked-out edge of the windshield to a second position 40" at the end of its sweep area. It will be noted that the blade 40 is oriented at an obtuse angle of about 100 degrees at its second position 40" relative to its first park position 40'. By virtue of the parallelogram mounting arrangement 24 the wiper blade distal end 44 is located at a first radially extending minimum position adjacent the left-hand side molding with the blade at its initial park location 40'. During each stroke the wiper blade distal end 44 traverses an arc 46 that progressively increases in radial extent relative to circular arc 48. The arc 48 indicates the blades "prior art" pattern without the incorporation of applicant's parallelogram apparatus 24. The prior art pattern is defined by a radius "R" with its center at the principal axis of drive shaft 14.

Thus it will be seen that the parallelogram arrangement allows an articulated wiper arm blade to wipe an extended area "A" denoted by the cross-hatched section in FIG. 1. This additional wiped area "A" is critical to a satisfactory wiping pattern for certain vehicle windshield installations wherein Federal Government Standards require that certain designated areas of a vehicle windshield be wiped a miminal amount during each stroke of the blade.

It will be noted that applicant's windshield wiper extension mechanism could also be used in a single wiper blade system wherein the blade 40 is capable of cleaning substantially the entire viewing area of a vehicle window. In such a system the blade 40 would sweep through an arc of about 180 degrees from its park position 40' to a second position wherein the blade is adjacent the right-hand reveal molding 12. In such a second position the distal end 44 is again located at a radially minimum position adjacent the right-hand side molding in a mirror image manner of its left-hand position.

It is understood that the invention is not limited to the exact construction illustrated and described above but various changes and modifications may be made without departing from the spirit and scope of the invention as defined in the following claims.

What is claimed is:

1. On a vehicle body including a windshield having a lower edge, a windshield wiper mechanism for said windshield comprising, a wiper blade having proximate and distal ends, an oscillatable wiper shaft disposed adjacent one lower edge of said windshield and rotatable in alternate directions between a first park position and a second position, a wiper arm having one end drivingly connected to said wiper shaft for rotation therewith throughout a stroke of predetermined angular extent, a pivot shaft disposed adjacent said wiper shaft, a drag arm having one end pivotally connected to said pivot shaft, said wiper arm being of greater length than said drag arm, the improvement comprising;

a three-line parallelogram arrangement extending substantially parallel with the plane of said windshield and connecting said wiper blade to the free end of said wiper arm and the free end of said drag arm, said three-line parallelogram including a pair of outer and inner links and a blade support link, said outer link having its one end pivotally connected to said wiper arm free end, and its other end pivotally connected to said blade support link, said blade support link having its other end pivotally connected to one end of said inner link, said inner link disposed in parallel coplanar relation with said outer link and having its other end pivotally connected to an intermediate point on said wiper arm, said inner link having an intermediate point thereon pivotally connected to said drag arm free end, whereby said pair of inner and outer links, said blade support link and the portion of said wiper arm between its said free end and its said intermediate point define said parallelogram arrangement, and pin means extending at right angles from said blade support link substantially in the plane thereof in a normal direction away from said wiper arm, said pin means connecting said wiper blade to said second link for movement parallel to said wiper arm, whereby said mechanism operative to position said wiper blade distal end at a radial minimum location when said blade is at said first park position adjacent said windshield one lower edge, and wherein said mechanism operative to traverse said wiper blade upper end on an arc that progressively increases in radial extent relative to a circular arc traversed by said wiper arm free end, such that said blade distal end being positioned at a radially maximum location when said blade is at said second position defined by a predetermined angle with said blade at said first park position adjacent said windshield one lower edge.

* * * * *